No. 858,769. PATENTED JULY 2, 1907.
C. W. WARNER.
SPARE TIRE HOLDER.
APPLICATION FILED MAR. 18, 1907.
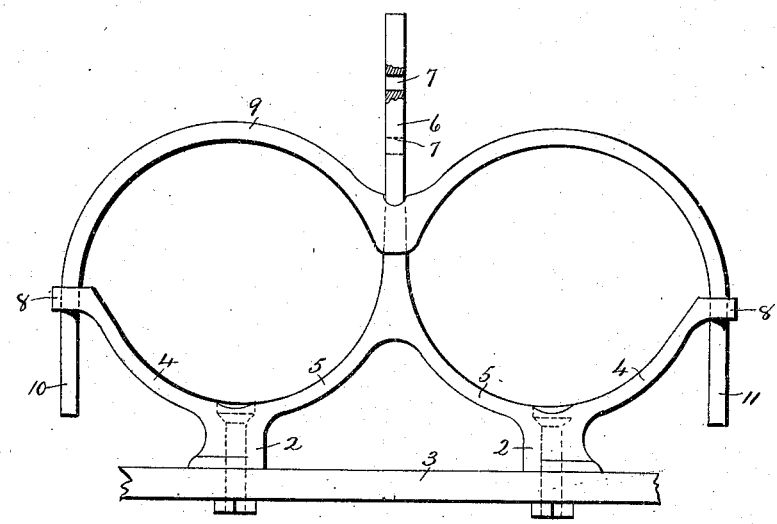
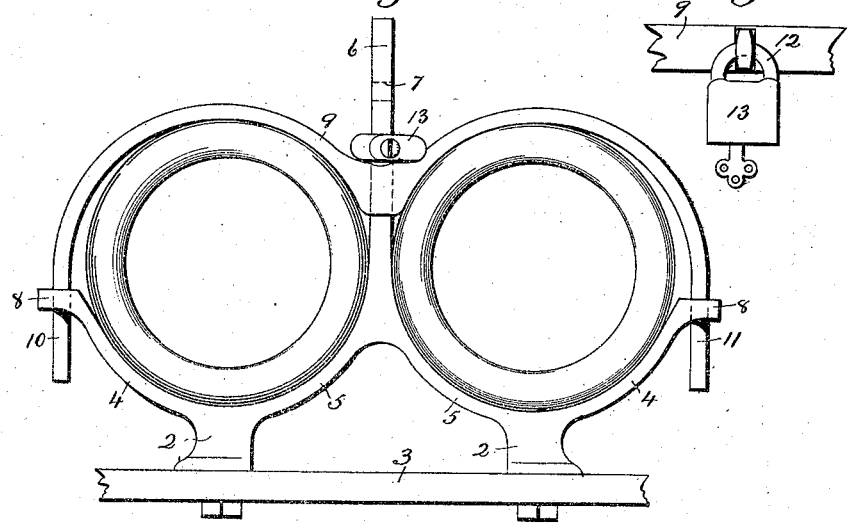
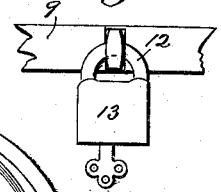
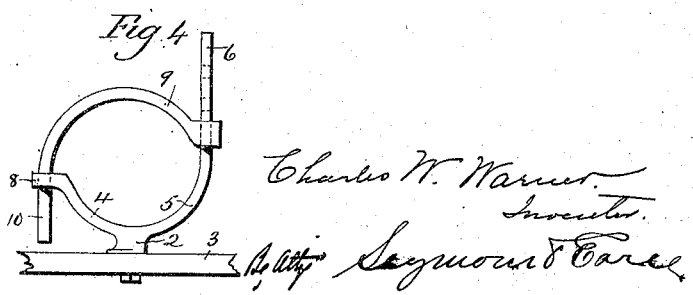

UNITED STATES PATENT OFFICE.

CHARLES W. WARNER, OF MIDDLETOWN, CONNECTICUT.

SPARE-TIRE HOLDER.

No. 858,769.  Specification of Letters Patent.  Patented July 2, 1907.

Application filed March 18, 1907. Serial No. 362,971.

*To all whom it may concern:*

Be it known that I, CHARLES W. WARNER, a citizen of the United States, residing at Middletown, in the county of Middlesex and State of Connecticut, have invented a new and useful Improvement in Spare-Tire Holders; and I do hereby declare the following, when taken in connection with the accompanying drawings and the letters of reference marked thereon, to be a full, clear, and exact description of the same, and which said drawings constitute part of this specification and represent in—

Figure 1 a front or plan view of a double spare tire holder constructed in accordance with my invention and shown partially in section and with padlock removed. Fig. 2 a similar view illustrating the device as holding two tires in place. Fig. 3 a broken top or plan view showing a padlock engaged with the vertically arranged post. Fig. 4 a front view on a small scale of a device embodying my invention and adapted to hold one tire.

This invention relates to an improvement in spare tire holders adapted for use on motor vehicles for holding spare tires in place and preventing their removal.

Spare tires are usually carried by motor vehicles and usually rest upon the running board to which they are strapped or clamped; but frequently when vehicles are left unattended, these spare tires have been stolen.

The object of this invention is to provide a clamp by which the spare tires may be locked to the vehicle, and the invention consists in the construction as hereinafter described and particularly recited in the claims.

Preferably and as shown in Figs. 1 and 2 of the drawings, the device is adapted to clamp and hold two spare tires and consists of two bases 2 adapted to be bolted or otherwise secured to the running board 3 of a motor vehicle. From each base arms 4, 5 extend, the arms 5 being united and carried up to form a vertical post 6 which is formed with holes or perforations 7 more or less in number. In the outer ends of the arms 4 are eyes 8. The arms 4, 5, are bowed corresponding to the form of vehicle tires. Passing over the post is a yoke 9 having ends 10, 11, adapted to pass down through the eyes 8 and so as to rest upon the upper portion of the tires. This yoke is pressed down upon the tires so as to hold them in close engagement with the arms 4, 5, and when in place is held by passing the shackle 12 of a padlock 13 through one of the holes 7 in the post, and so that when the padlock is engaged and locked with the post the yoke cannot be removed, and hence a tire cannot be surreptitiously removed.

It will be apparent, and as shown in Fig. 4 of the drawings, that my invention is equally applicable for a device for supporting and holding one spare tire, as the device may consist of a single base 2, single arms 4 and 5, the arm 5 extending up forming a post 6 and adapted to have the single yoke set over it and held in place and locked to it in the same way as in a holder for two tires.

I claim:—

1. The herein described spare tire holder comprising a base, arms projecting upward therefrom, one of said arms extended upward forming a post, a yoke set over said post, an arm of the yoke passing through an opening formed for it in one of said arms, and means for locking the yoke on the post, substantially as described.

2. The herein described spare tire holder comprising two bases, arms projecting upward therefrom, two of said arms united and extended upward to form a vertically arranged post, a yoke adapted to set over said post and formed with ends adapted to pass through the outer ends of the arms, said post formed with transverse holes for the engagement therewith of a padlock, substantially as described.

In testimony whereof, I have signed this specification in the presence of two subscribing witnesses.

CHARLES W. WARNER.

Witnesses:
HOWARD R. CLARK,
FRANK H. BULLARD, Jr.